US010635067B2

(12) United States Patent
Hwang et al.

(10) Patent No.: US 10,635,067 B2
(45) Date of Patent: Apr. 28, 2020

(54) INTELLIGENT BUILDING AUTOMATION APPARATUS OF AUTONOMOUS CONTROL AND CONTROL METHOD THEREOF

(71) Applicant: NARA CONTROLS INC., Seoul (KR)

(72) Inventors: Gwan Sun Hwang, Seoul (KR); Dong Wook Ko, Gwangmyeong-si (KR); Se Woong Park, Seoul (KR)

(73) Assignee: NARA CONTROLS INC., Seoul (KR)

( * ) Notice: Subject to any disclaimer, the term of this patent is extended or adjusted under 35 U.S.C. 154(b) by 0 days.

(21) Appl. No.: 16/195,787

(22) Filed: Nov. 19, 2018

(65) Prior Publication Data

US 2019/0271957 A1 Sep. 5, 2019

(30) Foreign Application Priority Data

Mar. 5, 2018 (KR) .................. 10-2018-0025894

(51) Int. Cl.
*G05B 19/042* (2006.01)
*H04L 12/18* (2006.01)
(Continued)

(52) U.S. Cl.
CPC .......... *G05B 19/042* (2013.01); *H04L 12/189* (2013.01); *H04L 41/0806* (2013.01); *H04L 41/22* (2013.01); *H04L 61/2007* (2013.01); *H04L 67/12* (2013.01); *H04W 24/04* (2013.01); *G05B 2219/25011* (2013.01); *H04L 61/6022* (2013.01)

(58) Field of Classification Search
CPC ........................................... G05B 2219/25011
USPC ........................................................ 700/275
See application file for complete search history.

(56) References Cited

U.S. PATENT DOCUMENTS

2010/0163633 A1* 7/2010 Barrett .................. F24F 13/082
236/49.3
2010/0260061 A1* 10/2010 Bojahra .................. H04L 41/00
370/252
(Continued)

FOREIGN PATENT DOCUMENTS

KR 10-1335738 B1 12/2013
KR 10-1724135 B1 4/2017

OTHER PUBLICATIONS

Swan, "Internetworking with BACnet: A first look at networking in BACnet" accessed at http://web.archive.org/web/20160313052116/http"//www.bacnet.org/Bibliography/ES-1-97/ES-1-97.htm, via archive.org, Mar. 13, 2016, 7 pgs (Year: 2016).*
(Continued)

*Primary Examiner* — Emilio J Saavedra
(74) *Attorney, Agent, or Firm* — Revolution IP, PLLC

(57) ABSTRACT

A self-regulating intelligent building automation system includes: a smart sensing unit including a first sensing unit disposed in a first specific space and a second sensing unit disposed in a second specific space separated from the first specific space; a self-regulating terminal unit including a first self-regulating terminal disposed in the first specific space and a second self-regulating terminal disposed in the second specific space; a network management unit managing a network without a direct digital control unit and wirelessly communicating with the smart sensing unit and the self-regulating terminal unit; and a central monitoring unit connected to the network management unit via the Internet.

11 Claims, 6 Drawing Sheets

(51) Int. Cl.
*H04L 12/24* (2006.01)
*H04L 29/12* (2006.01)
*H04L 29/08* (2006.01)
*H04W 24/04* (2009.01)

(56) References Cited

U.S. PATENT DOCUMENTS

2012/0109404 A1* 5/2012 Pandey ............... H04L 67/12
  700/299
2016/0148498 A1* 5/2016 Ruszala ............. G06F 3/04842
  340/506
2018/0328611 A1* 11/2018 Bullock ................ F24F 11/30

OTHER PUBLICATIONS

"Data Network Resource: IP Addressing" accessed at http://web.archive.org/web/20170426155953/http://www.rhyshaden.com/ipadd.htm, via archive.org, Apr. 26, 2017, 5 pgs (Year: 2017).*

* cited by examiner

INTELLIGENT BUILDING AUTOMATION APPARATUS OF AUTONOMOUS CONTROL AND CONTROL METHOD THEREOF

FIELD

The present invention relates to a smart building automation system and a method for controlling the same, and, more particularly, to a self-regulating intelligent building automation system which can provide automatic control to maintain a pleasant environment in the building in an energy-saving manner without using a direct digital controller (DDC, local controller), and a method for controlling the same.

BACKGROUND

Generally, large and medium sized buildings such as an office tower, a public institution building, and an apartment are provided with building facilities such as an air conditioner, a boiler, and a pump to control the temperature and humidity of air in a room and to purify the air, thereby keeping the environment of the room suitable for intended use.

The buildings are also provided with a building automation system for controlling the building facilities. Generally, such a building automation system includes a direct digital controller (DDC), which is a local controller.

Such a direct digital controller (DDC) collects and sends information necessary for temperature/humidity control of a heating and air conditioning system, monitoring/controlling/reporting operation status of building facilities, energy measurement and management, monitoring/controlling a power system, a security alarm system and a fire fighting system.

However, a typical direct digital controller adapted to control the entire building automation system has a problem in that control and management over the building automation system are impossible when an algorithm executing unit of the direct digital controller malfunctions.

In addition, since such a typical direct digital controller is hardwired to other components, there are concerns of performance deterioration over time, high maintenance cost, generation of crosstalk-induced noise, increase in possibility of lightning strike, and the like.

Further, for the typical direct digital controller, it is difficult to change the position of existing equipment when remodeling, and additional cabling work is required when extending the equipment, causes increase in construction period and cost.

Prior Literature

Patent Document 0001: Korean Patent No. 10-1081990 (entitled "Method of controlling building automation system", publication date: Nov. 9, 2011).

SUMMARY

It is one object of the present invention to provide a self-regulating intelligent building automation system which has control and management functions to maintain a pleasant environment in the building in an energy-saving manner without using a direct digital controller (DDC, local controller), and a method for controlling the same.

It is another object of the present invention to provide a self-regulating intelligent building automation system which can reduce maintenance/replacement costs while improving overall operational stability since, when an abnormality occurs in one of multiple area/function-specific self-regulating terminal units disposed in a specific area, it is possible to repair the abnormal terminal unit alone, and a method for controlling the same.

It is a further object of the present invention to provide a self-regulating intelligent building automation system which is based on a wireless network and thus can have a simple structure while reducing installation costs, and a method for controlling the same.

In accordance with one aspect of the present invention, there is provided a self-regulating intelligent building automation system including: a smart sensing unit including a first sensing unit disposed in a first specific space and a second sensing unit disposed in a second specific space separated from the first specific space; a self-regulating terminal unit including a first self-regulating terminal disposed in the first specific space and a second self-regulating terminal disposed in the second specific space; a network management unit managing a network without a direct digital controller and wirelessly communicating with the smart sensing unit and the self-regulating terminal unit; and a central monitoring unit connected to the network management unit via the Internet.

The first self-regulating terminal may contain a first autonomous algorithm for autonomously controlling an indoor environment of the first specific space based on data received from outside, and the second self-regulating terminal may contain a second autonomous algorithm for autonomously controlling an indoor environment of the second specific space based on data received from outside.

The network management unit may include: a downstream router unit receiving first environment data from the first sensing unit through wireless communication with the first sensing unit; an upstream router unit receiving second environment data from the second sensing unit through wireless communication with the second sensing unit and wirelessly communicating with the downstream router unit; and a gateway communicating data with at least one of an external server, the smart sensing unit, and the self-regulating terminal unit.

When the second self-regulating terminal requires the first environment data, the downstream router unit may transmit the first environment data to the upstream router unit without transmitting the first environment data to a first wireless terminal group connected downstream of the downstream router unit. Here, the upstream router unit may transmit the first environment data to a second wireless terminal group connected downstream of the upstream router unit and disposed in the second specific space.

The first self-regulating terminal may further include: a first data collector collecting first required data for autonomously determining and controlling the indoor environment of the first specific space; a first data analyzer unit analyzing the first required data; a first control mode generator autonomously generating a control mode for controlling the indoor environment of the first specific space based on analysis results from the first data analyzer unit; and a first control signal output unit generating a control signal for executing the control mode.

The first required data may include various data which the first self-regulating terminal receives from at least one of the smart sensing unit, another self-regulating terminal on the network, the network management unit, the central monitoring unit, and an external server.

The first control mode generator may autonomously generate a specific control mode for maintaining a pleasant indoor environment through analysis of the first required data, the specific control mode being selected from among plural control modes comprising an enthalpy control mode, a CO2 control mode, and a general ventilation control mode; and the first control signal output unit may generate a specific control signal for executing the specific control mode.

In accordance with another aspect of the present invention, there is provided a method for controlling the self-regulating intelligent building automation system set forth above, wherein the method includes: a data collection step in which the first self-regulating terminal receives first required data for controlling the indoor environment of the first specific space from outside and the second self-regulating terminal receives second required data for controlling the indoor environment of the second specific space from outside; a data analysis step in which the second self-regulating terminal analyzes the second required data while the first self-regulating terminal analyzes the first required data; a control mode generation step in which the first self-regulating terminal generates a first control mode for the first specific space based on analysis results of the first required data and the second self-regulating terminal generates a second control mode based on analysis results of the second required data; a control signal generation step in which the first self-regulating terminal generates a first control signal corresponding to the first control mode and the second self-regulating terminal generates a second control signal corresponding to the second control mode; and an environment control step in which a first control target unit controls an environment of the first specific space based on the first control signal and a second control target unit controls an environment of the second specific space based on the second control signal.

The method may further include: a data sensing step including sensing, by the first sensing unit, the first environment data; a first data packet transmission step in which the first sensing unit transmits a first data packet including the first environment data to the downstream router unit; and a determination step including a first determination step in which whether the downstream router unit transmits the first data packet to the first wireless terminal group connected downstream of the downstream router unit is determined based on attributes of the first data packet.

In the first data packet transmission step, the first data packet may include a first destination address corresponding to an address of the downstream router unit, a first source address corresponding to an address of the first sensing unit, a first final destination address field demand value associated with a final destination of the first data packet, an initial data reporter address corresponding to an address of the first sensing unit, and a reported data value corresponding to the first environment data.

In the first determination step, whether the first final destination address field demand value is a predetermined final destination address field demand value may be determined.

The method may further include: a first downstream group broadcasting step in which, when the first final destination address field demand value is the predetermined final destination address field demand value, the downstream router unit transmits a second data packet to communication nodes around the downstream router unit, the second data packet comprising a second address field value having the communication nodes as a destination, a second source address corresponding to the address of the downstream router unit, a final destination field value having the first wireless terminal group as a final destination, the initial data reporter address, and the reported data value.

In the first downstream group broadcasting step, among the communication nodes, wireless terminals connected upstream of the downstream router unit may not receive the second data packet and the first wireless terminal group may receive the second data packet.

The method may further include the steps of: calculating, by a controller of the downstream router unit, a second final destination address field demand value by subtracting a certain value from the first final destination address field demand value when the first final destination address field demand value is not the predetermined final destination address field demand value; and transmitting, by the downstream router unit, a second data packet to the upstream router unit without transmitting the second data packet to the first wireless terminal group, wherein the second data packet includes a second destination address corresponding to an address of the upstream router unit, a second source address corresponding to the address of the downstream router unit, the second final destination address field demand value, the initial data reporter address, and the reported data value.

The method may further include: a smart mapping step in which information including MAC addresses of wireless terminals including the smart sensing unit and the self-regulating terminal unit, the kinds of wireless terminals in accord with the MAC addresses, installation locations of the wireless terminals, and control settings for the wireless terminals is automatically mapped to the wireless terminals.

The smart mapping step may include: installing the wireless terminals at the respective installation locations; scanning, by a separate external wireless terminal wirelessly communicating with the network management unit, the wireless terminals; displaying the wireless terminals on an application of the external wireless terminal along with information associated with the wireless terminals; confirming whether the wireless terminals are installed at the respective installation locations; generating a mapping table on the central monitoring unit from mapping information including the MAC addresses of wireless terminals, the kinds of wireless terminals, the installation locations of the wireless terminals, and the control settings for the wireless terminals; and receiving, by the network management unit, the mapping table from the central monitoring unit.

Effects of a self-regulating intelligent building automation system according to the present invention and a method for controlling the same are as follows:

Firstly, the self-regulating intelligent building automation system uses self-regulating terminals based on a wireless network and thus can provide automatic control to maintain a pleasant environment in the building in an energy-saving manner without using a direct digital controller (DDC, local controller).

Secondly, the self-regulating intelligent building automation system can transmit environment data only to a self-regulating terminal requiring the environment data through downstream group broadcasting, thereby minimizing communication traffic.

Thirdly, the self-regulating intelligent building automation system uses self-regulating terminals without a direct digital controller and thus can have a simple structure while reducing installation costs.

Fourthly, the self-regulating intelligent building automation system controls an indoor environment using a self-regulating terminal unit and thus can allow repair of only a self-regulating terminal in a specific area in which an abnormality occurs, thereby reducing maintenance/replacement costs while improving overall operational stability.

DRAWINGS

DETAILED DESCRIPTION

Figure 1:
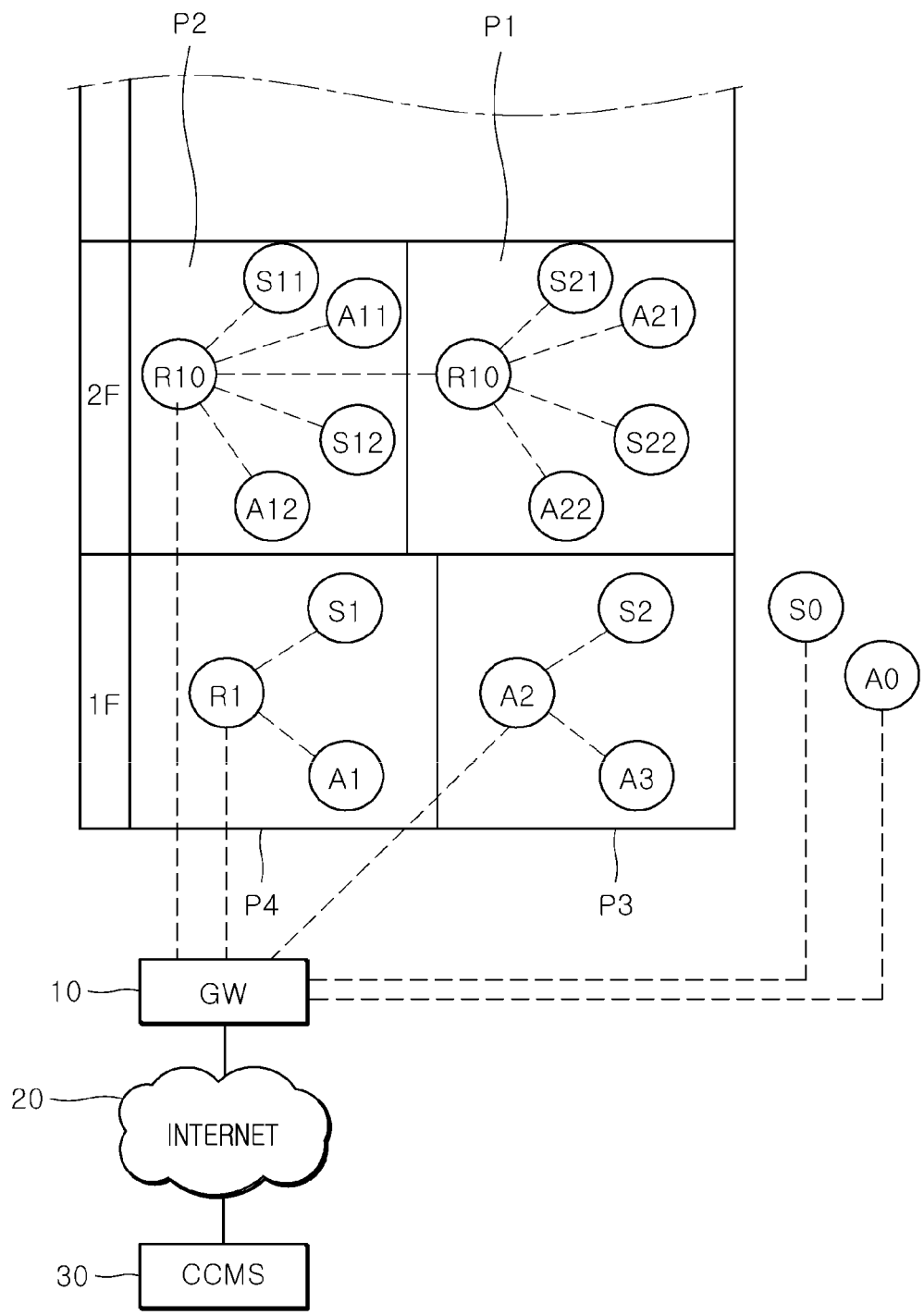
FIG. 1 is a schematic diagram of an intelligent building automation system according to one embodiment of the present invention.

Hereinafter, embodiments of the present invention will be described with reference to the accompanying drawings. It should be noted that like components will be denoted by like reference numerals throughout the specification and the accompanying drawings. In addition, descriptions of details apparent to those skilled in the art will be omitted for clarity.

A self-regulating intelligent building automation system according to one embodiment of the present invention will be described with reference to FIG. 1 and FIG. 2.

The intelligent building automation system according to this embodiment includes: a smart sensing unit; a self-regulating terminal unit; a network management unit; and a central monitoring unit 30.

The smart sensing unit includes a first sensing unit S21 sensing first environment data associated with an environment of a first specific space P1 inside the building and a second sensing unit S11 sensing second environment data associated with an environment of a second specific space P2 separated from the first specific space P1.

Figure 2:
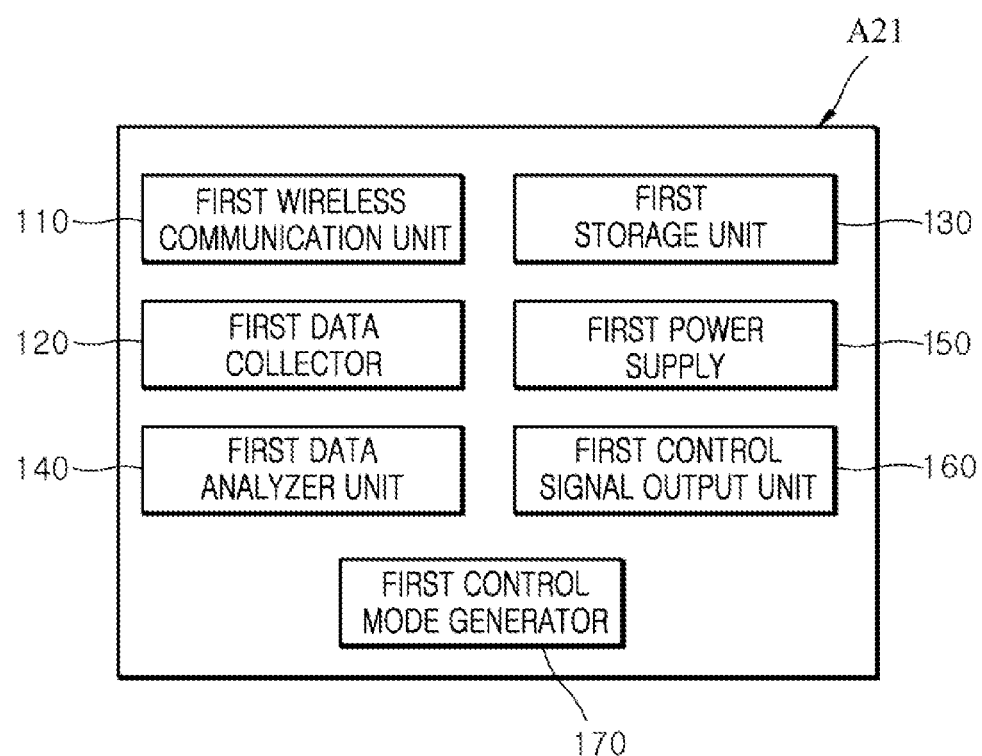
FIG. 2 is a block diagram of a first self-regulating terminal of the intelligent building automation system shown in FIG. 1.
Figure 3:
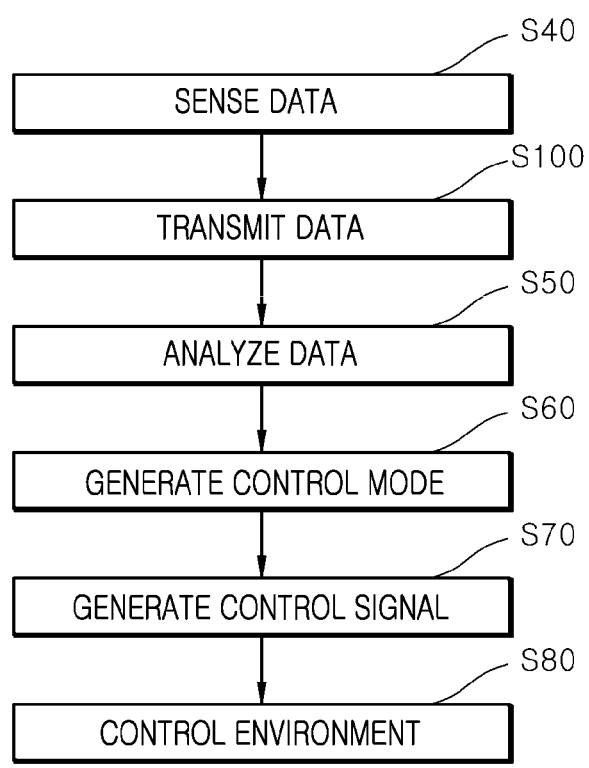
FIG. 3 is a flowchart of a control process of the intelligent building automation system shown in FIG. 1.

In FIG. 1, S22 denotes a sensing unit which is disposed in the first specific space P1 and is different from the first sensing unit S21 and S12 denotes a sensing unit which is disposed in the second specific space P2 and is different from the second sensing unit S11.

The first sensing unit S21 may measure, for example, the indoor temperature and humidity and carbon dioxide concentration of the first specific space P1. Accordingly, the first environment data may include, for example, the indoor temperature and humidity and carbon dioxide concentration of the first specific space P1.

Likewise, the second sensing unit S11 may measure, for example, the indoor temperature and humidity and carbon dioxide concentration of the second specific space P2 and the second environment data may include, for example, the indoor temperature and humidity and carbon dioxide concentration of the second specific space P2.

The smart sensing unit may further include an external sensing unit S0 disposed outside the building to sense external environment data. The external sensing unit S0 may measure, for example, the outdoor temperature, humidity and fine dust concentration. Accordingly, the external environment data may include, for example, the outdoor temperature, humidity and fine dust concentration.

It should be understood that the smart sensing unit may further include a third sensing unit S2 disposed in a third specific space P3 on another floor of the building, for example, on the first floor of the building and a fourth sensing unit S1 in a fourth specific space P4 on the other floor of the building.

The self-regulating terminal unit includes a first self-regulating terminal A21 disposed in the first specific space P1 and a second self-regulating terminal A11 disposed in the second specific space P2.

In FIG. 1, A22 denotes a self-regulating terminal which is disposed in the first specific space P1 and is different from the first self-regulating terminal A21 and A12 denotes a self-regulating terminal which is disposed in the second specific space P2 and is different from the second self-regulating terminal A11.

In addition, the self-regulating terminal unit may include a third self-regulating terminal A2 disposed in the third specific space P3 and a fourth self-regulating terminal A1 disposed in the fourth specific space.

The self-regulating terminal unit may further include an external self-regulating terminal A0 disposed outside the building.

The network management unit communicates wirelessly with at least one of the smart sensing unit and the self-regulating terminal unit to manage a network without a direct digital controller.

The network management unit may include: a downstream router unit R20 receiving the first environment data from the first sensing unit S21 through wireless communication with the first sensing unit S21; an upstream router unit R10 receiving the second environment data from the second sensing unit S11 through wireless communication with the second sensing unit S11 and wirelessly communicating with the downstream router unit R20; and a gateway 10 communicating data with at least one of an external server, the smart sensing unit, and the self-regulating terminal unit.

In FIG. 1, reference numeral R1 denotes an upstream router unit on the first floor of the building.

When the first environment data is required by the second self-regulating terminal A11, the downstream router unit R20 may transmit the first environment data to the upstream router unit R10 without transmitting the first environment data to a first wireless terminal group connected downstream of the downstream router unit R20. Here, the upstream router unit R10 may transmit the first environment data to a second wireless terminal group connected downstream of the upstream router unit R10 and disposed in the second specific space P2.

Herein, the first wireless terminal group refers to a group of self-regulating terminals disposed in the first specific space P1 and wirelessly communicating with the downstream router unit R20, and the second wireless terminal group refers to a group of self-regulating terminals disposed in the second specific space P2 and wirelessly communicating with the upstream router unit R10.

The central monitoring unit 30 is connected to the network management unit via the Internet 20.

In this way, with the self-regulating terminal unit based on a wireless network, the intelligent building automation system according to this embodiment can provide efficient automatic control to maintain a pleasant environment in the building in an energy-saving manner without using a direct digital controller.

In addition, since the intelligent building automation system uses the self-regulating terminal unit without a direct digital controller, the structure of the system can be simplified, thereby reducing installation cost, while area/function-specific control over the indoor environment can be provided, whereby, when an abnormality occurs in a specific area, it is possible to repair only the self-regulating terminal unit in the specific area, thereby reducing maintenance/replacement costs while improving overall operational safety.

The first self-regulating terminal A21 may contain a first autonomous algorithm for autonomously controlling the indoor environment of the first specific space P1 based on data received from outside and the second self-regulating terminal A11 may contain a second autonomous algorithm for autonomously controlling the indoor environment of the second specific space P2 based on data received from outside.

The first self-regulating terminal A21 may receive data including at least one of the first environment data and the second environment data from the downstream router unit R20.

However, it should be understood that the present invention is not limited thereto and the first self-regulating terminal A21 may directly receive necessary data through mapping with a separate self-regulating terminal and sensing unit disposed on the network to autonomously control the environment of the first specific space P1, or may receive data directly from an external server. For example, the third self-regulating terminal A2 may receive data directly from another self-regulating terminal A3 and the third sensing unit S2 in the third specific space, as shown in FIG. 1.

Likewise, the second self-regulating terminal A11 may receive data including at least one of the first environment data and the second environment data from the upstream router unit R10. In addition, the second self-regulating terminal A11 may directly receive necessary data through mapping with a separate self-regulating terminal and sensing unit disposed on the network to autonomously control the environment of the second specific space P2, or may receive data directly from an external server.

In other words, each of the first self-regulating terminal A21 and the second self-regulating terminal A11 may receive data required to control the environment of the first specific space P1 or the second specific space P2 through mapping with the sensing unit, another self-regulating terminal, the router unit, and the external server connected thereto via the network.

However, it should be understood that the present invention is not limited thereto and each of the first self-regulating terminal A21 and the second self-regulating terminal A11 may perform a routing function.

Alternatively, the self-regulating terminal unit may perform only a routing function while leaving a self-regulating function to the central monitoring unit. For example, the central monitoring unit may be connected to the sensing unit, the control target unit, another self-regulating terminal unit, and the network management unit via one network to communicate data, thereby autonomously controlling the control target unit while managing and monitoring the building automation system.

Alternatively, the self-regulating terminal unit may perform some self-regulating functions, while the network management unit may perform other self-regulating functions while managing the network. For example, the self-regulating terminal unit may perform function/area-specific autonomous control based on required data, whereas the network management unit may perform autonomous control over the entire building automation system, including scheduling control.

Since the second self-regulating terminal A11 has the same structure as the first self-regulating terminal A21, only the first self-regulating terminal A21 will be described in detail with reference to FIG. 2.

The first self-regulating terminal A21 may include: a first data collector 120 collecting first required data for autonomously determining and controlling the indoor environment of the first specific space P1; a first data analyzer unit 140 analyzing the first required data; a first control mode generator 170 autonomously generating a control mode for controlling the indoor environment of the first specific space P1 based on analysis results from the first data analyzer unit 140; and a first control signal output unit 160 generating a control signal for performing the control mode.

In addition, the first self-regulating terminal A21 may further include: a first wireless communication unit 110 for communication with external communication nodes; a first storage unit 130 storing collected data and generated data; and a first power supply 150 supplying power to the components of the first self-regulating terminal A21.

Herein, the first required data refers to any data required for autonomously controlling the indoor environment of the first specific space P1. That is, the first required data may include various data which the first self-regulating terminal receives from at least one of another self-regulating terminal, the smart sensing unit, the network management unit, the central monitoring unit, and the external server on the network.

For example, the first required data may include indoor environment data associated with the specific indoor spaces, including the first environment data and the second environment data, outdoor environment data, time data, and external data.

The first environment data may include the indoor temperature and humidity and carbon dioxide concentration of the first specific space P1, and the second environment data may include the indoor temperature and humidity and carbon dioxide concentration of the second specific space P2.

The outdoor environment data may include the outdoor temperature, humidity and fine dust concentration, the time data may include data associated with date and time, and the external data may include scheduling data associated with a control schedule.

The first data collector 120 acquires the first required data from the self-regulating terminal, the smart sensing unit, the router unit, the external server, and the gateway 10, which are mapped to the first self-regulating terminal A21.

The first data analyzer unit 140 analyzes the first required data in real time, the first control mode generator 170 generates an optimal control mode for the first specific space P1, and the first control signal output unit 160 outputs a control signal corresponding to the control mode. The first data analyzer unit 140, the first control mode generator 170, and the first control signal output unit 160 are operated according to the first autonomous algorithm.

The first control mode generator 170 may autonomously generate a specific control mode for maintaining a pleasant indoor environment based on analysis results of the first required data, wherein the specific control mode may be selected from among a plurality of control modes including an enthalpy control mode, a $CO_2$ control mode, and a general ventilation control mode, and the first control signal output unit 160 may generate a specific control signal for executing the specific control mode.

For example, when the first self-regulating terminal A21 drives a damper, the first control mode generator 170 autonomously generates an enthalpy control mode for maintaining an optimal environment based on the first required data, provided that enthalpy control is possible at the present point in time based on the time data, wherein the enthalpy control mode may be set according to times when enthalpy control is required and conditions required for enthalpy control.

The first control signal output unit 160 may generate a control signal for driving the damper to execute the enthalpy control mode.

The first self-regulating terminal A21 may control a ventilator by generating a ventilation mode for ventilation with outdoor air when the concentration of carbon dioxide in the first specific space P1 exceeds a reference value of indoor carbon dioxide concentration.

In addition, when the outdoor fine dust concentration exceeds a reference value of fine dust concentration during the ventilation mode, each self-regulating terminal may stop the ventilation mode to prevent inflow of outdoor air and may generate an air purification mode to control an air purifier.

The self-regulating terminal may determine operation status of an air conditioner to perform control over supply air temperature/humidity and ventilation air temperature/humidity of the specific space based on the required data including values of indoor temperature/humidity, or to perform dehumidification control depending on the value of indoor humidity.

In addition, the self-regulating terminal may control not only the environment of a corresponding specific space in an area-specific manner but also a corresponding control target unit in a function-specific manner. For example, the self-regulating terminal may perform function-specific control over a control target unit such as an air conditioner, a fan, or a pump according to conditions set for the control target unit.

In this way, the self-regulating terminal can control the control target unit such as an air conditioner, a ventilator, and a purifier based on the required data needed to provide area/function-specific control over the building, thereby maintaining a pleasant environment in a corresponding specific space in an energy-saving manner.

Next, a method of controlling the intelligent building automation system according to one embodiment of the invention will be described with reference to FIG. 1 to FIG. 6.

First, a data sensing step is performed (S40). Specifically, the smart sensing unit collects indoor environment data and outdoor environment data. That is, the first sensing unit S21 senses the first environment data for the first specific space P1 and the second sensing unit S11 senses the second environment data for the second specific space P2.

Then, a data transmission step is performed in which the sensed data is transmitted (S100). Details of the data transmission step will be described below with reference to FIG. 4 to FIG. 6.

Then, a data collection step is performed in which the first self-regulating terminal A21 receives the first required data for controlling the indoor environment of the first specific space P1 from outside and the second self-regulating terminal A11 receives the second required data for controlling the indoor environment of the second specific space P2 from outside.

Then, a data analysis step is performed in which the second self-regulating terminal A11 analyzes the second required data while the first self-regulating terminal A21 analyzes the first required data (S50).

Then, a control mode generation step is performed in which the first self-regulating terminal A21 generates a first control mode for the first specific space P1 based on analysis results of the first required data and the second self-regulating terminal A11 generates a second control mode based on analysis results of the second required data (S60).

Then, a control signal generation step is performed in which the first self-regulating terminal A21 generates a first control signal corresponding to the first control mode and the second self-regulating terminal A11 generates a second control signal corresponding to the second control mode (S70).

Then, an environment control step is performed in which a first control target unit controls the environment of the first specific space P1 based on the first control signal and a second control target unit controls the environment of the second specific space P2 based on the second control signal (S80).

Now, a first downstream group broadcasting step of the data transmission step will be described in detail with reference to FIG. 1, FIG. 4 and FIG. 5.

First, a first data packet transmission step is performed in which the first sensing unit S21 transmits a first data packet including the first environment data to the downstream router unit R20 (S111).

Figure 5:
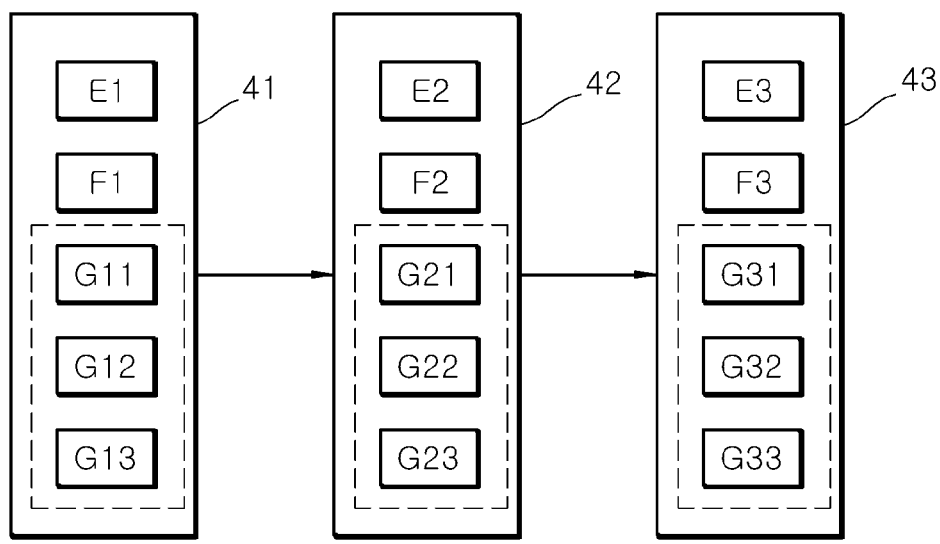
FIG. 5 is a diagram of data packet frames in a first downward group broadcasting step of the data transmission step shown in FIG. 4.

Referring to FIG. 5, a frame of the data packet contains destination information associated with an address of a recipient at the present point in time, source information associated with an address of a sender at the present point in time, final destination information associated with a final destination of data, reporter address information associated with an address of an initial data reporter, and a reported data value associated with data intended to be reported by the initial reporter.

In the first data packet transmission step, the first data packet includes a first destination address E1 corresponding to an address of the downstream router unit R20, a first source address F1 corresponding to an address of the first sensing unit S21, a first final destination address field demand value G11 associated with a final destination of the first data packet, an initial data reporter address G12 corresponding to an address of the first sensing unit S21, and a reported data value G13 corresponding to the first environment data.

Then, the downstream router unit R20 receives the first data packet (S112).

Then, a determination step is performed which includes a first determination step for determining whether the downstream router unit R20 transmits the first data packet to the first wireless terminal group based on attributes of the first data packet (S120).

Here, the first determination step may be a step of determining whether the first final destination address field demand value is a predetermined final destination address field demand value.

If the first final destination address field demand value is a predetermined final destination address field demand value, the downstream router unit R20 performs the first downstream group broadcasting step (S140).

Before the first downstream group broadcasting step, in the frame 41 of the first data packet, the first destination address E1 denotes R20, the first source address F1 denotes S21, the first final destination address field demand value G11 denotes FFE1, the initial data reporter address G12 denotes S21, and the reported data value G13 denotes the first environment data.

Here, the final destination address field demand value may be set from FFE0 to FFEF, wherein FFE0 is a predetermined final destination address field demand value. When a corresponding router unit receives FFE1 as the final destination address field demand value, the router unit performs downstream group broadcasting in which the data packet is transmitted to a wireless terminal group connected downstream of the router unit.

Here, the first final destination address field demand value transmitted by each sensing unit is set to correspond to the location on the network of a self-regulating terminal which uses the first environment data.

In the first downstream group broadcasting step, the downstream router unit R20 transmits a second data packet to communication nodes around the downstream router unit R20, wherein the second data packet includes a second address field value E2 having the communication nodes as a destination, a second source address F2 corresponding to the address of the downstream router unit R20, a final destination field value G21 having the first wireless terminal group as a final destination, the initial data reporter address G22, and the reported data value G23.

In a frame 42 of the second data packet, E2 has a value of FFFF, F2 has a value of R20, G21 has a value of FFF0, G22 has S21, and G23 has the first environment data.

Here, FFFF means that all communication nodes around a corresponding router unit are set as a destination at the present point in time, and FFF0 means that a final destination in the first downstream group broadcasting step is the first wireless terminal group downstream of the corresponding router unit.

Accordingly, in the first downstream group broadcasting step, among the communication nodes, wireless terminals connected upstream of the downstream router unit R20 do not receive the second data packet and the first wireless terminal group receives the second data packet.

Then, the upstream router unit R10 receives the second data packet from the downstream router unit R20 and sends a third data packet to the network management unit, wherein the third data packet includes a third destination address E3 corresponding to the address of the network management unit, a third source address F3 corresponding to the address of the upstream router unit R10, a third final destination address G31 corresponding to the address of the network management unit, the initial data reporter address G32, and the reported data value G33.

In a frame 43 of the third data packet, E3 has a value of GW, F3 has a value of R10, G21 has a value of GW, G32 has S21, and G33 has the first environment data. Here, GW refers to the address of the network management unit.

Figure 4:
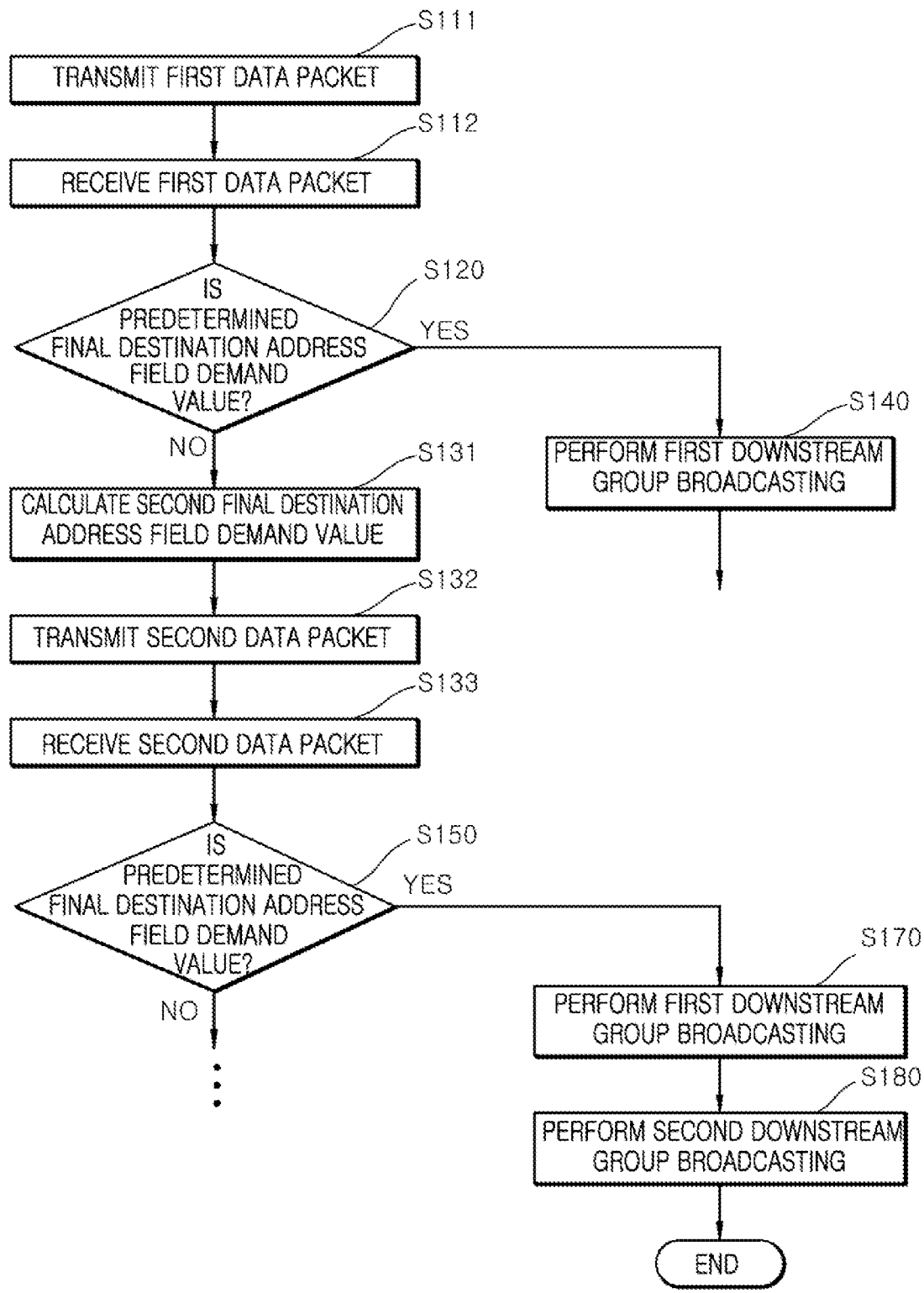
FIG. 4 is a detailed flowchart of a data transmission step of the process shown in FIG. 3.
Figure 6:
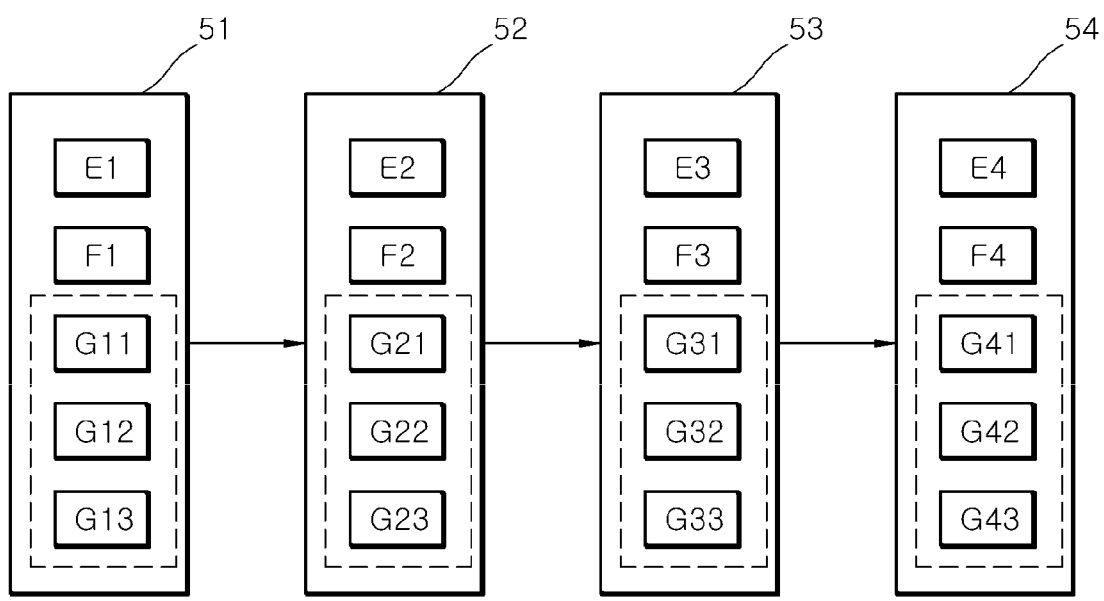
FIG. 6 is a diagram of data packet frames in the first downward group broadcasting step and the second downstream group broadcasting step of the data transmission step shown in FIG. 4.

Next, a process in which the first downstream group broadcasting step and a second downstream group broadcasting step are performed, that is, a process in which the first environment data of the first sensing unit S21 is transmitted to a second self-regulating terminal group downstream of the upstream router R10 in the second specific space P2 and the first self-regulating terminal group downstream of the downstream router unit R20 in the first specific space P1 will be described with reference to FIG. 1, FIG. 4, and FIG. 6.

As described above, the first data packet transmission step is performed in which the first sensing unit S21 transmits the first data packet including the first environment data to the downstream router unit R20 (S111).

In the frame 51 of the first data packet, the first destination address E1 denotes R20, the first source address F1 denotes S21, the first final destination address field demand value G11 denotes FFE2, the initial data reporter address G12 denotes S21, and the reported data value G13 denotes the first environment data.

Then, the downstream router unit R20 receives the first data packet (S112).

Then, the determination step is performed which includes the first determination step of determining whether the downstream router unit R20 transmits the first data packet to the first wireless terminal group based on attributes of the first data packet (S120).

Since the first final destination address field demand value is FFE2 and the preset final destination address field demand value is FFE1, the first final destination address field demand value is not the predetermined final destination address field demand value.

Accordingly, a controller of the downstream router unit R20 calculates a second final destination address field demand value by subtracting a certain value, that is, 1, from the first final destination address field demand value (S131). That is, the downstream router unit R20 calculates FFE1 as the second final destination address field demand value.

Then, the downstream router unit R20 transmits the second data packet to the upstream router unit R10 without transmitting the second data packet to the first wireless terminal group, wherein the second data packet includes a second destination address E2 corresponding to the address of the upstream router unit R10, a second source address F2 corresponding to the address of the downstream router unit R20, the second final destination address field demand value G21, the first data reporter address G22, and the reported data value G23(S132).

In a frame 52 of the second data packet, E2 has a value of R10, F2 has a value of R20, G21 has a value of FFE1, G22 has S21, and G23 has the first environment data.

Then, the upstream router unit R10 receives the second data packet (S133).

Then, the upstream router unit R10 determines whether to transmit the second data packet to a wireless terminal group downstream of the upstream router unit R10 based on attributes of the second data packet (S150).

Here, since the second final destination address field demand value corresponds to the predetermined final destination address field demand value, the upstream router unit R10 performs the first downstream group broadcasting step (S170).

In the first downstream group broadcasting step, the upstream router unit R10 sends a third data packet to communication nodes around the upstream router unit R10, wherein the third data packet includes a third address field value E3 having the communication nodes as a destination, a third source address F3 corresponding to the address of the upstream router unit R10, a final destination field value G31 having the second wireless terminal group as a final destination, the initial data reporter address G32, and the reported data value G33.

In a frame 53 of the third data packet, E3 has a value of FFFF, F3 has a value of R10, G31 has a value of FFF0, G32 has S21, and G33 has the first environment data.

Accordingly, in the first downstream group broadcasting step, among the communication nodes, the second wireless terminal group receives the third data packet.

Then, the downstream router unit R20 receives the third data packet from the upstream router unit R10 and performs the second downstream group broadcasting step in which a fourth data packet including the first environment data is transmitted to the first wireless terminal group (S180).

The downstream router unit R20 transmits the fourth data packet to communication nodes around the downstream router unit R20, wherein the fourth data packet includes a fourth address field value E4 having the communication nodes as a destination, a fourth source address F4 corresponding to the address of the downstream router unit R20, a final destination field value G41 having the first wireless terminal group as a final destination, the initial data reporter address G42, and the reported data value G43.

In a frame 54 of the fourth data packet, E4 has a value of FFFF, F4 has a value of R20, G41 has a value of FFFF, G42 has S21, and G43 has the first environment data.

Accordingly, even when G41 is set to FFFF in the second downstream group broadcasting step, among the communication nodes, wireless terminals connected upstream of the downstream router unit R20, which are set to receive data only from the upstream router unit, do not receive the fourth data packet and the first wireless terminal group receives the fourth data packet.

In this way, in the process of transmitting the environment data sensed by the sensing unit to self-regulating terminals, group broadcasting only to self-regulating terminals in an area requiring the environment data can be performed, thereby minimizing communication traffic.

However, it should be understood that the present invention is not limited thereto and the determination step may further include a second determination step to determine whether the downstream router unit R20 transmits the first environment data only to a specific self-regulating terminal corresponding to a final destination based on attributes of the first data packet.

When it is determined that the first data packet including the first environment data is transmitted only to the specific self-regulating terminal in the second determination step, if the specific self-regulating terminal is not present downstream of the downstream router unit R20, the downstream router unit R20 receives the first data packet and then transmits the second data packet including the first environment data only to the upstream router unit R10.

If the specific self-regulating terminal is connected downstream of the upstream router unit R10, the upstream router unit R10 transmits an acknowledgment signal to the downstream router unit R20. Here, a corresponding router unit knows information on self-regulating terminals connected downstream of the router unit.

After receiving the second data packet, the upstream router unit R10 may transmit the third data packet including the first environment data only to the specific self-regulating terminal or may transmit the fourth data packet including the first environment data only to another router unit to which the specific self-regulating terminal pertains.

Figure 7:
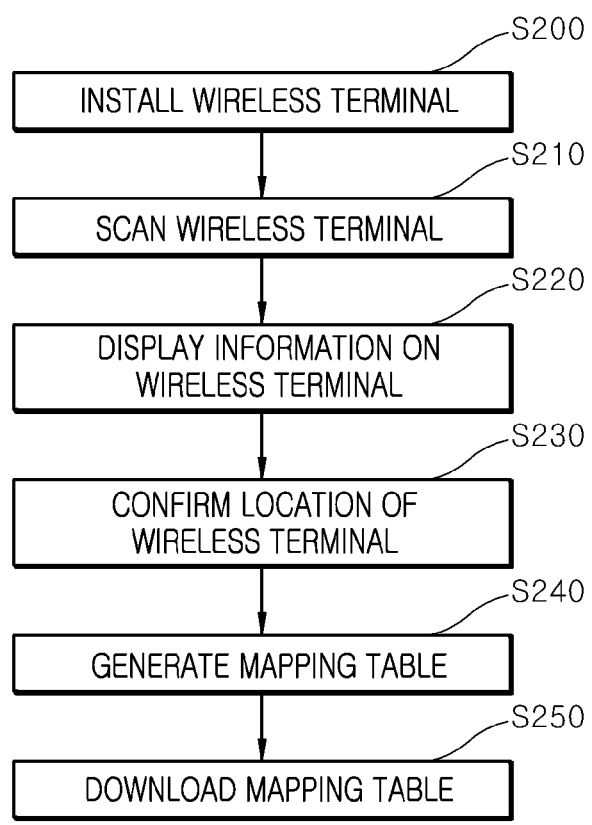
FIG. 7 is a flowchart of a process in which information associated with wireless terminals of the intelligent building automation system shown in FIG. 1 is automatically mapped to the wireless terminals.

Next, a process in which information associated with wireless terminals of the intelligent building automation system is automatically mapped to the wireless terminals will be described with reference to FIG. 1 and FIG. 7.

In the intelligent building automation system, a smart mapping step is a process in which mapping information is automatically mapped to wireless terminals, wherein the mapping information includes MAC addresses of the wireless terminals including the smart sensing unit and the self-regulating terminal unit, the kinds of wireless terminals in accord with the MAC addresses, installation locations of the wireless terminals, and control settings for the wireless terminals.

First, the wireless terminals are installed at the installation locations, respectively (S200).

Then, the wireless terminals are scanned by a separate external wireless terminal which communicates wirelessly with the network management unit 20 (S210).

Then, the wireless terminals are displayed along with information associated therewith on an application of the external wireless terminal (S220).

Then, a location confirmation step is performed in which whether the wireless terminals are installed at the installation locations is confirmed (S230).

In the location confirmation step, when a target wireless terminal is provided with an LED, an operator may confirm the location of the wireless terminal by adjusting LED toggling speed. When a target wireless terminal includes an actuator, the operator may confirm the location of the wireless terminal by moving the actuator to some extent and returning the actuator to the initial position thereof. When a target wireless terminal is sealed, the operator may confirm the location of the wireless terminal by operating a buzzer in the wireless terminal to confirm a sound from the buzzer.

Then, a mapping table generation step is performed in which the mapping information including the MAC addresses of the wireless terminals, the kinds of wireless terminals, the installation locations of the wireless terminals, and the control settings for the wireless terminals is created into a mapping table on the central monitoring unit 30 (S240).

The central monitoring unit 30 generates the mapping table based on information input from a user.

Then, the network management unit receives the mapping table from the central monitoring unit 30 (S250).

Finally, the network management unit sends the mapping information to the wireless terminals through wireless communication and the wireless terminals automatically register the mapping information, thereby completing the smart mapping step.

In this way, the mapping information can be automatically registered in the wireless terminals through the smart mapping step, whereby the wireless terminals can be easily installed at low cost.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

What is claimed is:

1. A self-regulating intelligent building automation system, comprising:
   a smart sensing unit comprising a first sensing unit disposed in a first specific space and a second sensing unit disposed in a second specific space separated from the first specific space;
   a self-regulating terminal unit comprising a first self-regulating terminal disposed in the first specific space and a second self-regulating terminal disposed in the second specific space;
   a network management unit wirelessly communicating with the smart sensing unit and the self-regulating terminal unit without a direct digital controller,
   wherein the network management unit comprises:
   a downstream router unit receiving first environment data from the first sensing unit through wireless communication with the first sensing unit;

an upstream router unit receiving second environment data from the second sensing unit through wireless communication with the second sensing unit and wirelessly communicating with the downstream router unit,
wherein the first self-regulating terminal receives at least one of the first environment data and the second environment data from the downstream router unit,
wherein the second self-regulating terminal receives at least one of the first environment data and the second environment data from the upstream router unit; and
a central monitoring unit connected to the network management unit via the Internet,
wherein the first self-regulating terminal contains a first autonomous algorithm for autonomously controlling an indoor environment of the first specific space based on data received from outside of the first specific space, and the second self-regulating terminal contains a second autonomous algorithm for autonomously controlling an indoor environment of the second specific space based on data received from outside of the second specific space,
wherein the first self-regulating terminal further comprises:
a first data collector collecting first required data for autonomously determining and controlling the indoor environment of the first specific space;
a first data analyzer unit analyzing the first required data;
a first control mode generator autonomously generating a control mode for controlling the indoor environment of the first specific space based on analysis results from the first data analyzer unit; and
a first control signal output unit generating a control signal for executing the control mode.

2. The self-regulating intelligent building automation system according to claim 1, wherein the network management unit further comprises:
a gateway communicating data with at least one of an external server, the smart sensing unit, and the self-regulating terminal unit.

3. The self-regulating intelligent building automation system according to claim 1, wherein, when the second self-regulating terminal requires the first environment data, the downstream router unit transmits the first environment data to the upstream router unit without transmitting the first environment data to a first wireless terminal group connected downstream of the downstream router unit, and the upstream router unit transmits the first environment data to a second wireless terminal group connected downstream of the upstream router unit and disposed in the second specific space.

4. The self-regulating intelligent building automation system according to claim 1, wherein the first required data comprises various data which the first self-regulating terminal receives from at least one of the smart sensing unit, another self-regulating terminal on the network, the network management unit, the central monitoring unit, and an external server; the first control mode generator autonomously generates a specific control mode for maintaining a pleasant indoor environment through analysis of the first required data, the specific control mode being selected from among plural control modes comprising an enthalpy control mode, a CO2 control mode, and a general ventilation control mode; and the first control signal output unit generates a specific control signal for executing the specific control mode.

5. A method for controlling the self-regulating intelligent building automation system according to claim 2, the method comprising:

a data collection step in which the first self-regulating terminal receives first required data for controlling the indoor environment of the first specific space from outside of the first specific space and the second self-regulating terminal receives second required data for controlling the indoor environment of the second specific space from outside of the second specific space;
a data analysis step in which the second self-regulating terminal analyzes the second required data while the first self-regulating terminal analyzes the first required data;
a control mode generation step in which the first self-regulating terminal generates a first control mode for the first specific space based on analysis results of the first required data and the second self-regulating terminal generates a second control mode based on analysis results of the second required data;
a control signal generation step in which the first self-regulating terminal generates a first control signal corresponding to the first control mode and the second self-regulating terminal generates a second control signal corresponding to the second control mode; and
an environment control step in which a first control target unit controls an environment of the first specific space based on the first control signal and a second control target unit controls an environment of the second specific space based on the second control signal.

6. The method according to claim 5, further comprising:
a data sensing step comprising sensing, by the first sensing unit, the first environment data;
a first data packet transmission step in which the first sensing unit transmits a first data packet comprising the first environment data to the downstream router unit; and
a determination step comprising a first determination step in which whether the downstream router unit transmits the first data packet to the first wireless terminal group connected downstream of the downstream router unit is determined based on attributes of the first data packet.

7. The method according to claim 6, wherein, in the first data packet transmission step, the first data packet comprises a first destination address corresponding to an address of the downstream router unit, a first source address corresponding to an address of the first sensing unit, a first final destination address field demand value associated with a final destination of the first data packet, an initial data reporter address corresponding to an address of the first sensing unit, and a reported data value corresponding to the first environment data; and, in the first determination step, whether the first final destination address field demand value is a predetermined final destination address field demand value is determined.

8. The method according to claim 7, further comprising:
a first downstream group broadcasting step in which, when the first final destination address field demand value is the predetermined final destination address field demand value, the downstream router unit transmits a second data packet to communication nodes around the downstream router unit, the second data packet comprising a second address field value having the communication nodes as a destination, a second source address corresponding to the address of the downstream router unit, a final destination field value having the first wireless terminal group as a final destination, the initial data reporter address, and the reported data value.

9. The method according to claim 8, wherein, in the first downstream group broadcasting step, among the communication nodes, wireless terminals connected upstream of the downstream router unit do not receive the second data packet and the first wireless terminal group receives the second data packet.

10. The method according to claim 7, further comprising the steps of:

calculating, by a controller of the downstream router unit, a second final destination address field demand value by subtracting a certain value from the first final destination address field demand value when the first final destination address field demand value is not the predetermined final destination address field demand value; and transmitting, by the downstream router unit, a second data packet to the upstream router unit without transmitting the second data packet to the first wireless terminal group, the second data packet comprising a second destination address corresponding to an address of the upstream router unit, a second source address corresponding to the address of the downstream router unit, the second final destination address field demand value, the initial data reporter address, and the reported data value.

11. The method according to claim 5, further comprising:

a smart mapping step in which information comprising MAC addresses of wireless terminals comprising the smart sensing unit and the self-regulating terminal unit, the kinds of wireless terminals in accord with the MAC addresses, installation locations of the wireless terminals, and control settings for the wireless terminals is automatically mapped to the wireless terminals, the smart mapping step comprising:

installing the wireless terminals at the respective installation locations;

scanning, by a separate external wireless terminal wirelessly communicating with the network management unit, the wireless terminals;

displaying the wireless terminals on an application of the external wireless terminal along with information associated with the wireless terminals;

confirming whether the wireless terminals are installed at the respective installation locations;

generating a mapping table on the central monitoring unit from mapping information comprising the MAC addresses of wireless terminals, the kinds of wireless terminals, the installation locations of the wireless terminals, and the control settings for the wireless terminals; and receiving, by the network management unit, the mapping table from the central monitoring unit.

* * * * *